(12) United States Patent
Gonthier

(10) Patent No.: US 6,658,182 B1
(45) Date of Patent: Dec. 2, 2003

(54) TEMPERATURE STABILIZATION OF TAPERED FIBER OPTIC COMPONENTS

(75) Inventor: François Gonthier, Ville Mont-Royal (CA)

(73) Assignees: ITF Technologies Optiques Inc., Saint-Laurent (CA); ITF Optical Technologies Inc., Saint-Laurent (CA)

(*) Notice: Subject to any disclaimer, the term of this patent is extended or adjusted under 35 U.S.C. 154(b) by 0 days.

(21) Appl. No.: 10/030,563
(22) PCT Filed: May 24, 2000
(86) PCT No.: PCT/CA00/00604
§ 371 (c)(1), (2), (4) Date: Jan. 3, 2002
(87) PCT Pub. No.: WO01/02886
PCT Pub. Date: Jan. 11, 2001

(30) Foreign Application Priority Data

Jun. 29, 1999 (CA) .............................................. 2276859

(51) Int. Cl.[7] ................................................. G02B 6/26
(52) U.S. Cl. ........................... 385/43; 385/14; 385/28; 385/51; 385/96; 385/99
(58) Field of Search .................. 385/14, 24, 27, 385/28, 30, 31, 39, 41–43, 50, 51, 95–99

(56) References Cited

U.S. PATENT DOCUMENTS

| | | | |
|---|---|---|---|
| 4,867,524 A | * 9/1989 | Courtney et al. | 350/96.2 |
| 5,165,001 A | 11/1992 | Takagi et al. | 385/42 |
| 5,243,680 A | 9/1993 | Soane | 385/137 |
| 5,367,589 A | 11/1994 | MacDonald et al. | 385/37 |
| 5,430,821 A | 7/1995 | Sasoka et al. | 385/99 |
| 5,633,965 A | * 5/1997 | Bricheno et al. | 385/37 |
| 5,708,740 A | * 1/1998 | Cullen | 385/39 |
| 5,809,190 A | * 9/1998 | Chen | 385/43 |
| 5,841,920 A | 11/1998 | Lemaire et al. | 385/37 |
| 6,081,641 A | 6/2000 | Chen | 385/43 |

FOREIGN PATENT DOCUMENTS

| | | | |
|---|---|---|---|
| EP | 0525743 | 2/1993 | G02B/6/28 |
| WO | WO98/02766 | 1/1998 | G02B/6/28 |
| WO | WO9923518 | 5/1999 | G02B/6/34 |

OTHER PUBLICATIONS

Chen P et al.; Temperature–Compensated, Polarization––Independent Biconical Tapered Fused Couplers for Dense Wavelength–Division–Multiplexers; Feb. 27, 1998; pp 335–336; San Jose, CA.

Villarruel C A et al.; Pressure Tolerant Single–Mode Fiber Coupler; May 15, 1987; pp. 1824–1826; Washington, DC.

* cited by examiner

Primary Examiner—John D. Lee
Assistant Examiner—Jennifer Doan
(74) Attorney, Agent, or Firm—George J. Primak

(57) ABSTRACT

A temperature stabilized tapered fiber optic component is produced, such as a fiber optic coupler or a fiber optic filter. In the case of the component such as a coupler, at least two fibers are fused and tapered to achieve a desired taper profile with suitable mechanical and wavelength properties. In the case of a component such as a fiber filter, only one fiber is tapered. Once the component is formed, it is solidly secured to a rigid substrate that produces a mechanical stress such as to compensate for any modal phase shift of the component due to temperature variation. Also, the mechanical phase dependence of the component may be adjusted in relation to the substrate to provide the desired temperature compensating effect. Preferably, both these features are used to achieve the best possible temperature stabilization.

16 Claims, 3 Drawing Sheets

US 6,658,182 B1

TEMPERATURE STABILIZATION OF TAPERED FIBER OPTIC COMPONENTS

BACKGROUND OF THE INVENTION

1. Field of the Invention

This invention relates to tapered optical fiber components, such as fused and tapered fiber couplers and tapered fiber filters, which are mounted on a rigid substrate which forms part of a packaging design that provides a temperature compensating effect and leads to athermal behaviour of the optical properties of the component. The invention also includes a method of securing the component to the rigid substrate and adjusting or controlling it so as to achieve the desired athermal behaviour.

2. Description of the Prior Art

It is known to provide fiber optic components, such as fiber couplers, with packaging such that the thermal expansion of the substrate used in the packaging matches that of the coupler. For example, in U.S. Pat. No. 5,243,680 a stiffener is provided in the package which has an equivalent thermal expansivity to that of the coupler.

U.S. Pat. No. 5,367,589 provides an optical fiber package where the sleeve is made of a material with a coefficient of thermal expansion that is about the same as that of the fiber material. In this patent it is explained that if the materials selected for the package and the fiber have identical coefficients of thermal expansion, then the materials will contract or expand to the same degree in response to a change in temperature. Thus, if the package and fiber exhibit the same such response to a change in temperature, the fiber will not be subjected to strains it would otherwise experience if the package and fiber expanded or contracted to different degrees in response to a change in temperature.

Also, in U.S. Pat. No. 5,430,821 there is provided a protective case for a fused optical fiber coupler where the coefficient of thermal expansion of the fused region of the optical fiber coupler is equivalent to that of the case, thereby reducing the stress occurrence due to the change in temperature.

It is also known to produce a fiber grating package to stabilize Bragg filters by introducing in an optical fiber containing embedded gratings a strain that compensates for temperature-induced changes in the wavelength reflected by the grating elements. One such device is disclosed in U.S. Pat. No. 5,841,920 where a tension adjusting member and a compensating member are provided and are formed of materials each selected so that as the temperature of the device decreases, the tension adjusting member contracts more than the compensating member and thus imposes an axial strain on the grating.

SUMMARY OF THE INVENTION

It has been surprisingly found that the basic principle of compensating the temperature dependent optical effect as used for Bragg gratings is also applicable to tapered optic devices, such as fused and tapered fiber couplers or tapered fiber filters, despite the fact that the problem in such devices is quite different from Bragg where the compensation is fiber dependent and requires compression rather than extension of the substrate as the temperature increases. Thus, the compensation of tapered devices, which mostly depends on their taper profile, represents a different problem to which this invention provides a solution.

As is known, fused and tapered fiber couplers are made by fusing two or more single mode optical fibers and fiber filters are made by heating and tapering single mode optical fibers until desired filtering properties are obtained. The tapering creates a region of smaller cross-section where the fiber cores cease to guide light, thereby creating cladding modes. Such cladding modes propagate in the tapered region, each mode having its own propagation constant; thus, they accumulate phase differences. The relative phase difference between the modes will determine if the light will interfere constructively or destructively in the output cores. This interference at the end of the tapered region will create either a phase dependent power transfer between optical fibers in couplers or filtering effects in single-fiber tapered filters. The principle behind couplers and filters is thus interferometric in nature and the phase difference and interference depends on the optical waveguide created in the tapered region. The phase difference generally increases approximately linearly as a function of wavelength, thus creating a sine-like spectral response of fiber couplers and filters. Because these components are fragile, the tapered fibers are usually bonded to a rigid substrate and enclosed in a tube or otherwise packaged for protection. It is the package that permits the tapered component to hold its properties over time. Though the spectral response of the tapered component can be ideally formed and packaged, it is not inherently stable with temperature, because the refractive index of silica depends on the temperature, and the interferometer phase will change as a function of temperature thus creating a shift in the wavelength response of the component The change in refractive index is small and may be of no consequence for components with very small phase difference, but can be very significant for components that have a sharper wavelength response because their modal phase difference is large.

According to the present invention, such optical change in a tapered component is compensated by a mechanical effect using a rigid substrate within a specially designed package that changes the length of the tapered component. This change of length creates an additional phase accumulation that opposes the phase change due to the change of index of refraction. This method can be applied not just to compensate the temperature change, but also to control it. It can thus enable the realization of components of predetermined positive or negative dependence in temperature shifts.

In order to achieve the control of the temperature dependence of the tapered components, this invention uses several particular properties of tapered structures and combines them to realize the desired effects.

Thus, in a longitudinally invariant waveguide, the phase difference between two modes is given by the equation $$\phi = \Delta\beta L$$

where $\phi$ is the phase difference, $\Delta\beta = \beta_1 - \beta_2$ represents the difference between the propagation constants of the modes $\beta_1$ and $\beta_2$ and L is the length of the tapered section of the waveguide.

Fiber couplers and fiber tapers are waveguides formed by an optical fiber core, an optical fiber cladding and a surrounding optical medium, which is often air.

In these waveguides, $\Delta\beta$ depends on the waveguide cross-section, on the indices of refraction and on wavelength. For a given cross-section, $\Delta\beta$ increases with wavelength. At a given wavelength, $\Delta\beta$ increases exponentially with the relative dimension of the cross-section. The smaller the taper wavelength, the larger the $\Delta\beta$.

A tapered profile is generally not perfectly uniform since the cross-section changes along the length of the tapered section. Thus, the total accumulated phase difference between the modes is the integral of all the local differences in propagation constants of the modes along the length of the taper sections as shown in the following equation:

$$\phi = \int_O^L \Delta\beta dz$$

If the length L is changed, the phase will change. This is easily verified experimentally by pulling on the tapered component, thus changing its length. The cycles that are observed during fabrication are due to the increase in phase because the component is pulled. After fabrication, the tapered component is flexible and can be mechanically elongated like a spring. One may not change the phase a lot before it brakes, but one will always observe a shift of the oscillation towards the lower wavelengths, corresponding to an increase of the phase.

On the other hand, if the coupler is only heated, a shift toward the higher wavelength is observed, showing that the decrease in the phase due to the decrease in the effective indices of the modes has a larger effect on the phase than the small increase in length due to the thermal expansion of silica.

If the tapered component is secured on the fused quartz substrate, the thermal elongation will be the same as that of the component itself, and a shift toward the higher wavelength will be observed.

On the other hand, if the tapered component is bonded to a substrate with a higher expansion coefficient, because the substrate has a much bigger cross-section than the tapered component, it will impose a length change to the tapered component which is greater than its normal length change. A greater phase shift toward the lower wavelength due to elongation will thus be applied to the interferometer. If this phase shift, due to elongation, is large enough, it will compensate the change due to the refractive index Thus, in order to realize a temperature compensating package, the objective lies in the matching of these two opposing phase shifts.

One can achieve this objective according to the present invention by choosing the correct thermal expansion of the substrate, by changing the mechanical phase dependence of the component to match a given substrate, or by a combination of both these features.

For a given spectral response, one can design a coupler or a filter with a given longitudinal profile. Such a device, once it is made, will have both a given temperature phase change property, such as where one can measure a ($\phi_t = \pi/10$ phase shift from 0 to 50° C., and a given mechanical phase change property, such as where an elongation of $1_s = 10 \mu m$ is needed to realize a $\phi_s = \pi/10$ phase shift. Thus, one needs to find a substrate which will cause the tapered section to elongate 10 $\mu m$ over 50° C. The elongation due to substrate $1_s$ is given by the following equation:

$$1_s = dK\Delta T$$

where d is the distance between the bond points, K is the thermal expansion coefficient of the substrate and $\Delta T$ is the temperature range. Because the tapered section is an exposed waveguide, the bond points have to be outside the tapered region, and, because of package length restriction, d will also have a maximum value. Thus, we have $$d_{min} < d < d_{max}$$

Furthermore K is greater than that of quartz, but if it is too big, it will over-compensate the component.

Thus, by carefully choosing the material and the length, one can compensate any component. However, given the limited availability of suitable materials and the limitation imposed on parameter d, it may be difficult to achieve perfect matching conditions all the time.

For this reason, and particularly if one can use only a limited number of materials, another solution may be adapted to match the two phase shifts. For example, if one has two types of materials of expansion coefficients $K_1$ and $K_2$, one can obtain $1_s$ by putting both materials end-to-end. With d1 being the distance between the first bond point and the junction point of the materials and d2 being the distance between the junction point and the second bond point, the elongation will be as follows:

$$1_s = (d_1 K_1 + d_2 K_2) \Delta T$$

Therefore, by combining different materials with different expansion coefficients one can obtain the same type of effect This, however, may not be always practical, because each and every tapered component design will require a different substrate or combination of substrates. For this reason, another technique may be used to help obtaining this design, which is the tailoring of the mechanical $1_s$ of the component itself. If one has a substrate of a given expansion coefficient and the length of the device is imposed by external conditions, one can change the $1_s$ of the component by changing its longitudinal profile. This can be easily understood by the fact that the tapered profile is not uniform, and for a given tension, a smaller section will elongate more than a larger section. Furthermore, because the phase difference in the smaller section is larger than in the larger section, the effect of the elongation will be greater. Thus, for two couplers that have the same total phase response, a component with a smaller waist will have a greater phase shift for a given total elongation than a component with a larger waist. Therefore, control on the mechanical $1_s$ can be achieved by making the component profile more abrupt or more flat. This technique has a significant impact on the $1_s$ value and is important in helping standardize the process with a limited number of substrate types. However, the tailoring of the profile is also used to control the wavelength properties of the devices and, therefore, two things must be taken into account when the profile is designed: it must yield both the correct wavelength response and the appropriate $1_s$ for the device to be properly temperature compensated.

In summary, the present invention includes a temperature stabilized tapered fiber optic component formed by fusion and/or tapering of optical fibers, creating a taper profile with a mechanical phase dependence and a predetermined wavelength response, which component is strongly bonded at its extremities to a rigid substrate made of a material having a thermal expansion coefficient greater than quartz and producing a mechanical stress adapted to compensate for any modal phase shift of the component due to temperature variation by matching substrate elongation response to the component wavelength response, and/or wherein the mechanical phase dependence of the component is adjusted in relation to the substrate to provide a desired temperature compensating effect. Preferably, both the use of the rigid substrate with a compensating mechanical stress and adjustment in the mechanical phase dependence of the component are employed to achieve the desired temperature compensating effect. The mechanical phase dependence can be changed by changing the taper profile of the component, but this should be done without significantly affecting the wavelength response thereof.

Also, the invention includes a method of temperature stabilization of tapered fiber optic components, which comprises:

(a) fusing and/or tapering optical fibers to form a tapered fiber optic component having a taper profile with a mechanical phase dependence and a predetermined wavelength response;

(b) firmly securing said component to a rigid substrate by strongly bonding it to the substrate at each end of the component.

(c) selecting a material for said substrate that has a thermal expansion coefficient greater than quartz and produces a predetermined mechanical stress such as to compensate for any modal phase shift of the component due to temperature variation; and/or (d) adjusting the mechanical phase dependence of the component in relation to the substrate to provide a desired temperature compensating effect without significantly affecting the wavelength response of the component.

This method can be iterated to obtain a minimal thermal shift or a predetermined wavelength shift.

BRIEF DESCRIPTION OF THE DRAWINGS

The invention will now be described with reference to the appended drawings, in which.

DETAILED DESCRIPTION OF THE INVENTION

Figure 1:
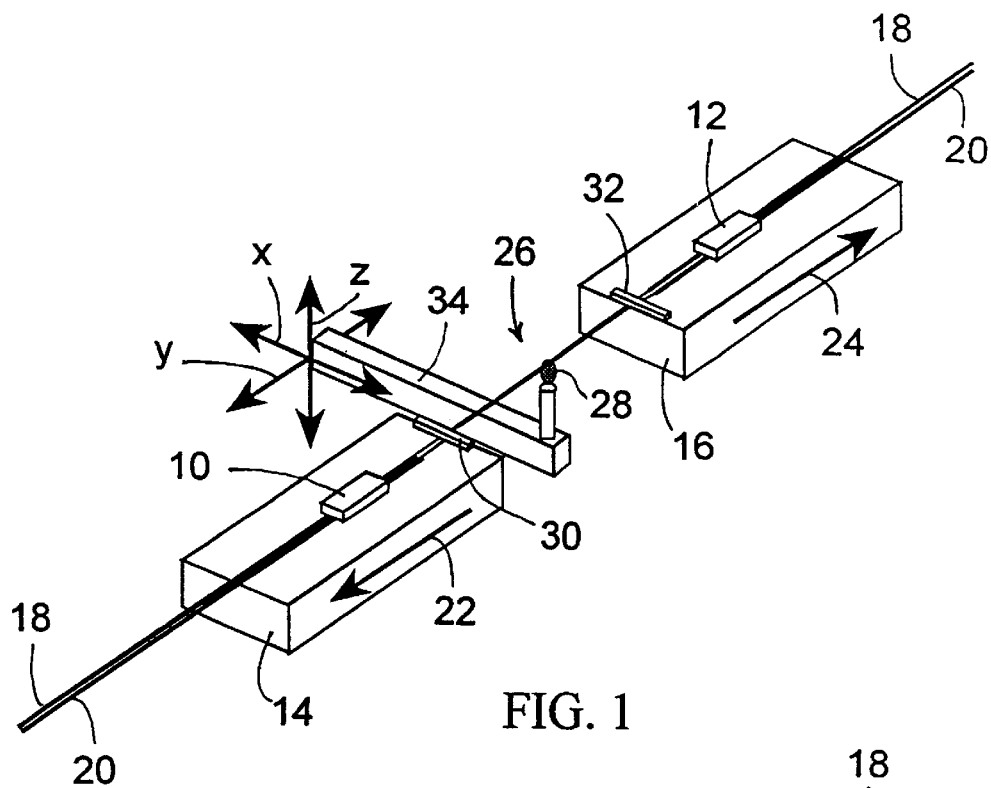
FIG. 1 is an illustration of a setup used in the fabrication of fiber optic components suitable for the purposes of the present invention.

The fiber optic component suitable for temperature stabilization in accordance with the present invention, such as a coupler or a filter or another type of waveguide interferometer, is produced on a setup such as shown in FIG. 1, which has two fiber holders 10 and 12 mounted on motorized stages 14 and 16 that can pull the fibers 18, 20 as shown by arrows 22, 24 to elongate the middle portion 26 heated by a heat source 28. Stages 14, 16 have a precise positioning resolution to enable precise control of the coupler or filter taper length in the middle portion 26, as well as a good control of the pulling speed produced by motorized stages 14, 16. Typically, the positioning properties are at 0.1 $\mu$m resolution.

The fiber holders 10, 12 are made such as to maintain the fibers 18, 20 firmly in place so that no slippage occurs during elongation. For the reproducibility of the process, the fiber holders must allow accurate and reproducible fiber positioning with respect to the position of the heat source 28 so that the desired longitudinal profile of the component may be reproduced from one fabrication to another and so that substrate elongation always produces the same shift in the component. For couplers or other components where at least two fibers are elongated, special mechanical alignment devices 30, 32 are used to hold the fibers 18, 20 properly aligned in the middle region 26. However, for fiber filters or tapers, only a single fiber is needed and thus only the positioning is important.

The heat source 28, which in FIG. 1 is shown to be a microtorch, could also be another suitable source, such as a small oven, a heating element or a laser, such as a $CO_2$ laser that may be focused on different parts of the taper profile in the region 26. Such a heat source should be mounted on a motorized stage 34 to allow it to move in x, y, z directions as shown by arrows x, y and z and thereby vary the heat pattern and position along the taper in region 26 to enable a precise shaping of the longitudinal profile of the component. The set-up may also have a protective shell (not shown) to limit undesired air movements around the heated fiber section.

The operation of the set-up illustrated in FIG. 1 is as follows:

After the fibers 18, 20 are stripped of their protective plastic jacket and thoroughly cleaned in their middle section 26, the fibers 18, 20 are placed in the holders 10, 12 and properly aligned with each other and with a heat source reference position. A computer program that controls both the positioning stage 34 of the heat source 28 and the fiber holder stages 14, 16 is used to bring the heat source close to the fibers. In a coupler, the fibers are fused with a predetermined fusion profile, usually a few millimeters long. This fusion profile constitutes one of the parameters that should be adjusted to match both the wavelength properties and the mechanical properties of the coupler. In a fiber filter, there is no fusion step, since only one fiber is used.

The next step for both the coupler and the filter is the elongation. The flame is brought close enough to the fibers to make them ductile. The motors (not shown) actuating the stages 14, 16 are operated to pull on the fiber(s) creating a fiber taper profile. This profile will depend on the flame heat pattern and position along the length of the taper and on the pulling speed.

In a coupler, it is important to realize an adiabatic profile, that is, a profile that has a taper slope small enough not to produce any coupling with higher order optical modes, which would in the end translate into undesired loss. To achieve this, a wide enough flame is required and one can brush the torch back and forth along the length to simulate a larger flame. One important thing in profile design is that the brush width can be varied during the elongation and this will change the profile shape and thus the mechanical and wavelength properties. For filters, the same torch control is also used, but one must create at one point in the process, some non-adiabatic regions to create the modal interferometer that gives the wavelength filtering properties to the components. For both the filter and the coupler, the elongation process is stopped when the desired wavelength period and phase are achieved.

Figure 2:
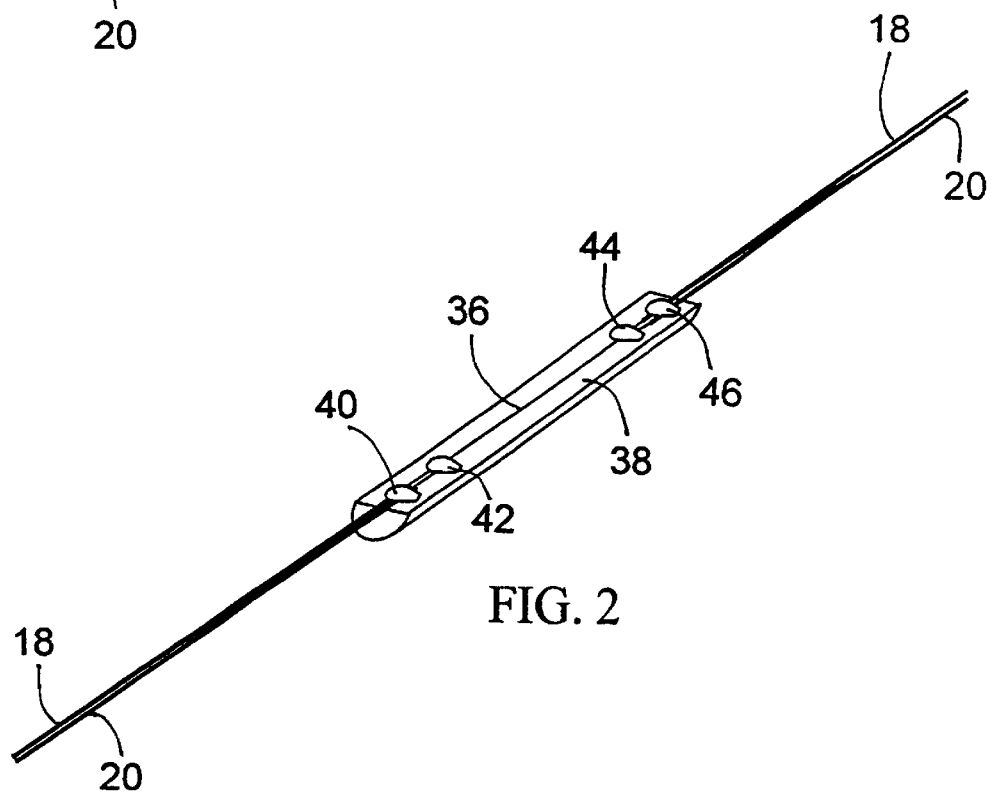
FIG. 2 is an illustration of a rigid substrate on which the fiber optic component is secured.

Once the desired component, such as a coupler or a filter, is produced as described above, it is secured to a chosen substrate as shown in FIG. 2. In this figure, the component 36 is shown to be secured to the rigid substrate 38 by adhesive bonds 40, 42, 44 and 46. These bonds between the fibers 18, 20, the component 36 and the rigid substrate 38 should be strong enough to impart upon the component the thermal expansion of the substrate. The substrate 38 is then inserted into a protective tube (not shown) or otherwise packaged. It should be noted that the bonding between the protective tube or package and the substrate should be supple, so that any unmatched temperature effect between the tube or package and the substrate does not affect the substrate.

Thus, in the design of a temperature compensating arrangement in accordance with the present invention, one must consider the fact that both the wavelength properties and the mechanical properties of the tapered component depend on the longitudinal taper shape. Thus, as opposed to Bragg gratings, where the thermal response depends on the fiber itself, tapered components with different longitudinal profiles, i.e., different wavelength periods and wavelengths, will have different temperature responses. One must thus develop the temperature compensating package of tapered components on a case by case basis. However, for components which have similar optical properties and longitudinal profiles, one can produce a new package by just making small modifications to a known functioning package and a person versed in the art can easily adapt the invention for his/her specific application.

EXAMPLES

Two non-limitative examples are provided by way of preferred embodiments of the present invention. The first example relates to a coupler with a 11 $\mu$m channel separation (1460–1471 $\mu$m) and the second to a sine-filter with a 1.6 $\mu$m channel separation at 1600 $\mu$m.

To achieve the temperature compensation, it is necessary to match the substrate elongation response to the component response. To know the component response, one can just bond the component to a quartz substrate. Since quartz has the same expansion coefficient ($5.5 \times 10^{-7}/°$ C.) as the fused silica of the fiber, the substrate does not induce any compensation effect Components bonded to a quartz substrate exhibit a shift towards the longer wavelength as the temperature increases. To produce a compensating elongation, the substrate should have a thermal expansion coefficient greater than quartz. For practical stock management reasons, it was decided to have a limited number of materials that have thermal expansion coefficient greater than quartz. For the couplers and filters fabricated herein, two types of silica glass were chosen, called type I and type II respectively, one with a thermal expansion coefficient of $13 \times 10^{-7}/°$ C. and the other of $18 \times 10^{-7}/°$ C., which were found adequate for the compensation for the purposes of the present invention.

Using these materials as the rigid substrate on which the component is mounted, a taper profile of the component is designed to produce the appropriate stress, given the substrate used, to insure the desired temperature compensation effect. Moreover, this profile, as indicated previously, should provide the required wavelength response for the coupler.

The profile design can be carried out in the following manner.

A standard profile is made to achieve approximately the desired wavelength response. Such a component is then bonded onto a type I substrate. The component spectral response is measured as a function of temperature, i.e. from –20° C. to +70° C. and the temperature shift is established. If the temperature shift is positive, the design does not provide enough temperature compensation and is under-compensated. If the shift is negative, then the design provides too much compensation and is over-compensated.

In the event of under-compensation, one can do several things, namely:

(a) choose a substrate with a larger temperature expansion coefficient, such as the type II glass; this selection is normally used if the under-compensation is large;

(b) place the two bonding points 42, 44 of the component further apart, creating a larger pulling effect;

(c) change the taper profile of the component to be more sensitive to strain; this can be done by designing a profile with a smaller waist, but it must be carefully done so as not to change the wavelength response of the component.

In the event of over-compensation, the following options are available:

(a) choose a substrate with a smaller expansion coefficient;

(b) place the bond points 42, 44 closer to each other, creating a lesser pulling effect; however, one may be limited here by the total taper distance, because the bond points should not be in the taper region;

(c) make the waist of the taper profile larger, which causes the component to become larger.

The above described process can be iterated to obtain the smallest possible thermal shift. Also, this iterative process can be used if one desires to obtain a predetermined non-zero wavelength shift.

The two examples performed pursuant to this invention are summarized below:

Example 1

Figure 3:
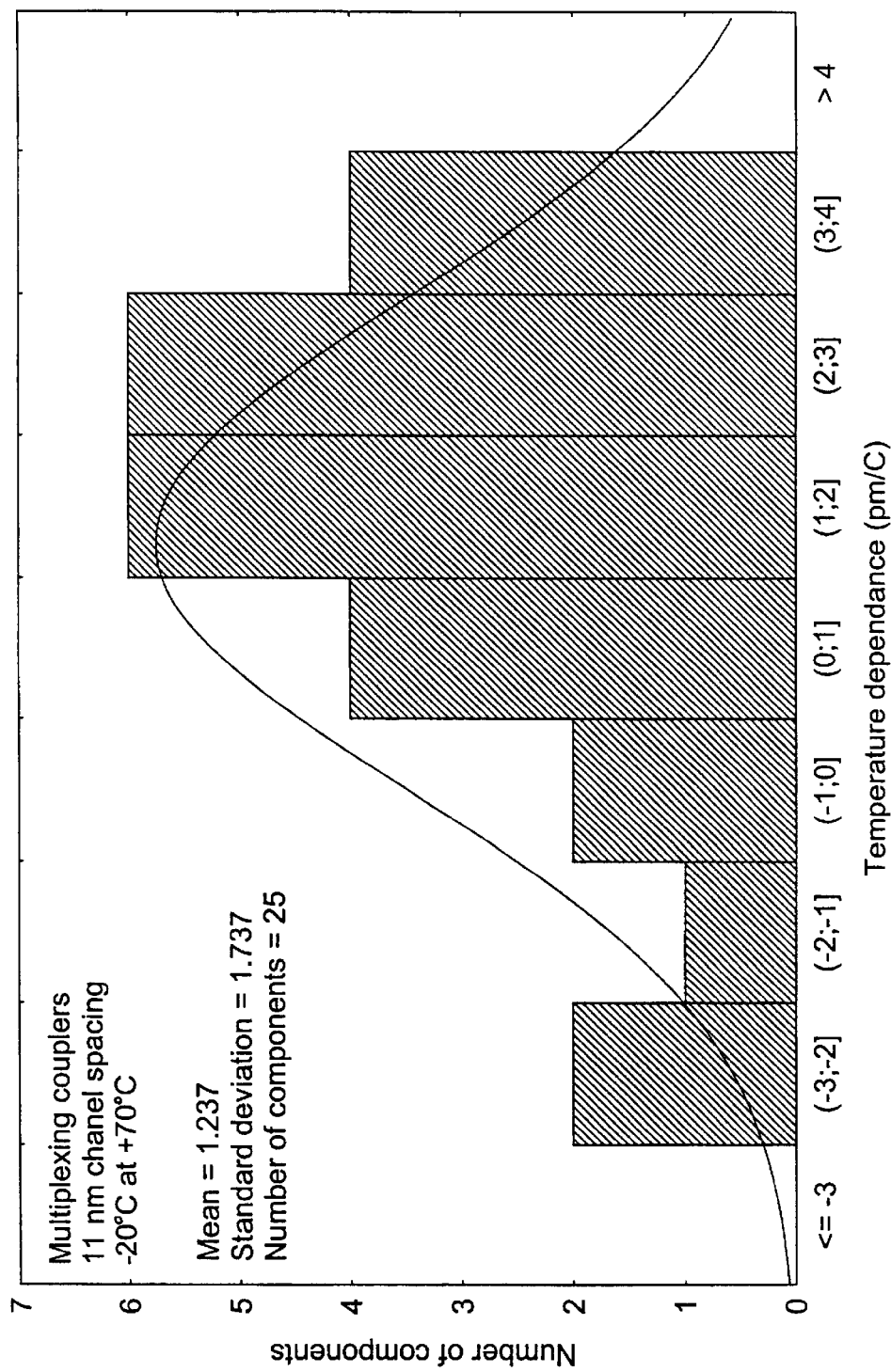
FIG. 3 is a graphic representation of results obtained in the stabilization of couplers in accordance with the present invention.

Twenty five multiplexing couplers with 11 $\mu$m channel spacing were produced. The tapered structure was elongated 33 mm to achieve proper wavelength spacing. The components were bonded to a 65 mm substrate of type I glass. The distance between the bond points was approximately 50 mm. The results are summarized in FIG. 3 where the spectral response of the components was measured between –20° C. and +70° C. and the temperature dependence in picometers per ° C. is given for the various components, with the curve indicating the mean value which in this case is 1.237 pm/° C. The statistical standard deviation is 1.737 pm/° C. for this example. It should be noted that in prior art couplers now on the market, temperature dependence is generally 8–10 pm/° C. and thus the temperature stabilized coupler of the present invention constitutes a considerable improvement over the prior art.

Example 2

Figure 4:
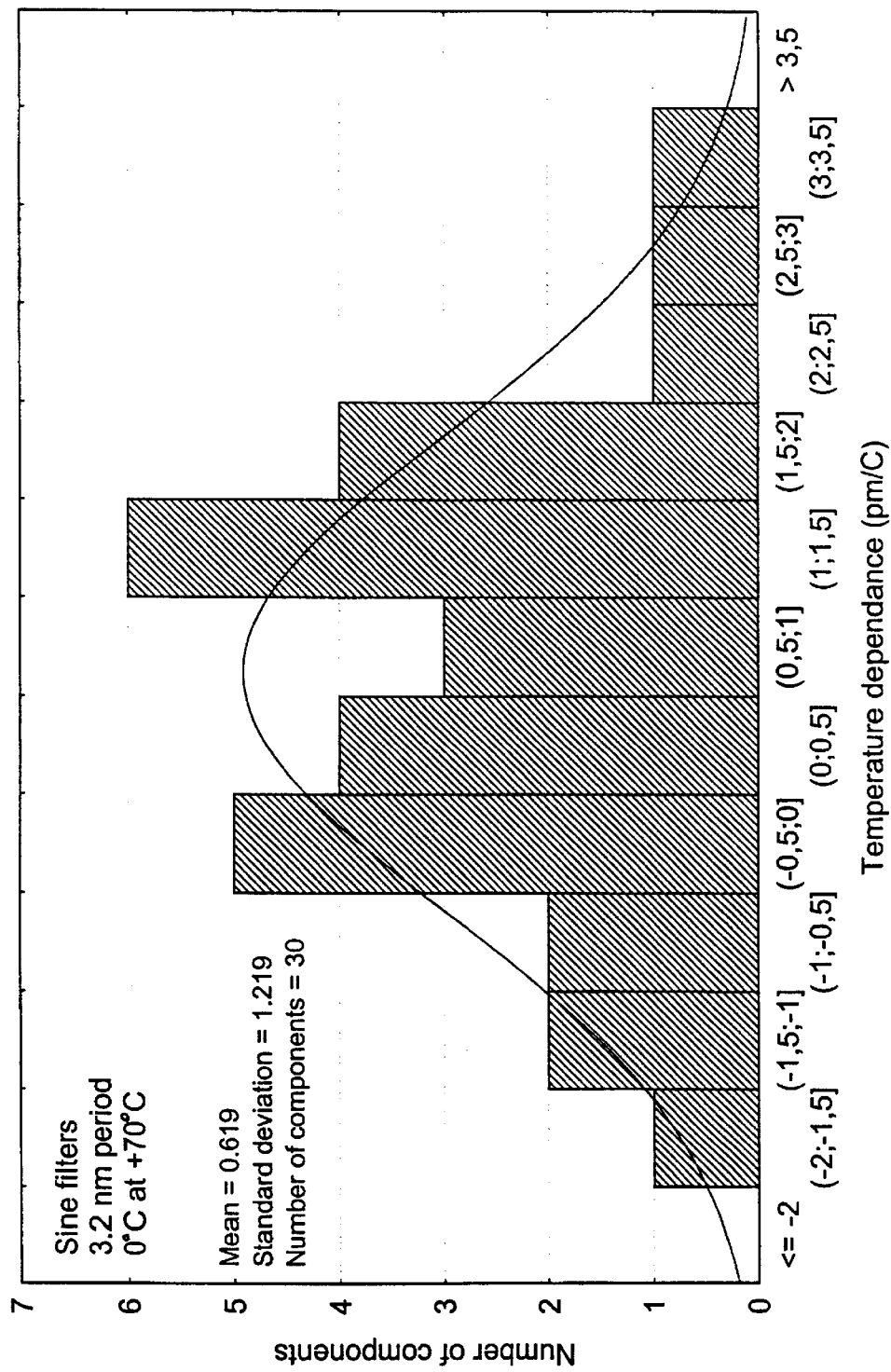
FIG. 4 is a graphic representation of results obtained in the stabilization of filters in accordance with the present invention.

Thirty sine filters with 3.2 $\mu$m period were produced. The tapered structure was elongated 35 mm to achieve proper wavelength spacing The components were bonded to a 70 mm substrate of type II glass. The distance between the bond points was approximately 55 mm. The results are summarized in FIG. 4 where the spectral response of the components was measured between 0° C. and +70° C. and the temperature dependence in picometers per ° C. is given for the various components, with the curve indicating the mean value which in this case is 0.619 pm/° C. The standard deviation is 1.219 pm/° C. for this example. It should be noted that in prior art filters now on the market, temperature dependence is generally 10–15 pm/° C. and thus the temperature stabilized filter of the present invention constitutes a considerable improvement over the prior art.

As the above examples demonstrate, every component needs a particular temperature stabilization design. However, once a proper design is established for a given component, it may only require a small modification to achieve stabilization if the change in the taper profile is small. It is thus fairly easy to adapt the design in accordance with the present invention to the various components.

It should be noted that the invention is not limited to the specifically described embodiments and examples, but that various modifications obvious to those skilled in the art can be made without departing from the spirit of the invention and the scope of the following claims.

What is claimed is:

1. A temperature stabilized tapered fiber optic component formed by fusion and/or tapering of optical fibers creating a taper profile with a mechanical phase dependence and a predetermined wavelength response, which component is strongly bonded at its extremities to a rigid substrate made of a material having a thermal expansion coefficient greater than quartz and producing a mechanical stress adapted to compensate for any modal phase shift of the component due to temperature variation by matching substrate elongation response to the component wavelength response, and/or wherein the mechanical phase dependence of the component is adjusted in relation to the substrate to provide a desired temperature compensating effect.

2. A temperature stabilized tapered fiber optic component according to claim 1, in which the rigid substrate is made of silica glass having a thermal expansion coefficient greater than quartz.

3. A temperature stabilized tapered fiber optic component according to claims 1 or 2, in which the substrate elongation response is determined by the following equation:

$$1_s = dK\Delta T$$

where $1_s$ s the substrate elongation; d is the distance between bond points of the component to the substrate; K is the thermal expansion coefficient of the substrate; and $\Delta T$ is the temperature variation.

4. A temperature stabilized tapered fiber optic component according to claim 1, in which the mechanical phase dependence of the component is changed by changing the taper profile of the component without significantly affecting the wavelength response of the component.

5. A temperature stabilized tapered fiber optic component according to claim 1, in which both the rigid substrate with the compensating mechanical stress and a change in the mechanical phase dependence of the component are used to achieve the desired temperature compensating effect.

6. A temperature stabilized tapered fiber optic component according to claim 1, which, together with the rigid substrate to which it is bonded, is enclosed in a protective tube or other suitable package that is not strongly connected to the substrate and does not produce a further compensating effect on the component due to temperature variation.

7. A temperature stabilized tapered fiber optic component according to claim 1, which is a fused fiber coupler formed with at least two optical fibers.

8. A temperature stabilized tapered fiber optic component according to claim 1, which is a fiber filter formed with a single optical fiber.

9. Method of temperature stabilization of tapered fiber optic components, which comprises:

(a) fusing and/or tapering optical fibers to form a tapered fiber optic component having a taper profile with a mechanical phase dependence and a predetermined wavelength response;

(b) firmly securing said component to a rigid substrate by strongly bonding it to the substrate at each end of the component;

(c) selecting a material for said substrate that has a thermal expansion coefficient greater than quartz and produces a predetermined mechanical stress such as to compensate for any modal phase shift of the component due to temperature variation; and/or (d) adjusting the mechanical phase dependence of the component in relation to the substrate to provide a desired temperature compensating effect without significantly affecting the wavelength response of the component.

10. Method according to claim 9, which comprises both selecting the material for said substrate that produces the predetermined mechanical stress and adjusting the mechanical phase dependence of the component in relation to the substrate.

11. Method according to claim 9, which comprises adjusting the distance between bond points of the component on the substrate to create a larger or lesser pulling effect.

12. Method according to claim 9, which comprises adjusting the taper profile of the component to achieve a closer temperature compensating effect.

13. Method according to claim 9, which comprises iterating the process to obtain minimal thermal shift or a predetermined non-zero wavelength shift.

14. Method according to claim 9, further comprising enclosing the component bonded to the rigid substrate in a protective tube or package without strongly connecting the substrate to the tube or package.

15. Method according to claim 9, comprising fusing and tapering at least two optical fibers to form a temperature stabilized fiber optic coupler.

16. Method according to claim 9, comprising tapering a single optical fiber to form a fiber optic filter.

* * * * *